(12) United States Patent
Lee et al.

(10) Patent No.: US 7,893,980 B2
(45) Date of Patent: Feb. 22, 2011

(54) CMOS IMAGE SENSOR HAVING DIRECTLY OUTPUT TRANSFER GATE SIGNAL

(75) Inventors: Youn Jung Lee, Gyeonggi-do (KR); Jae Soon Hwang, Seoul (KR); Hun Joon Jung, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 741 days.

(21) Appl. No.: 11/571,436

(22) PCT Filed: Jun. 30, 2005

(86) PCT No.: PCT/KR2005/002068
§ 371 (c)(1),
(2), (4) Date: Feb. 12, 2007

(87) PCT Pub. No.: WO2006/004351
PCT Pub. Date: Jan. 12, 2006

(65) Prior Publication Data
US 2007/0263107 A1 Nov. 15, 2007

(30) Foreign Application Priority Data
Jul. 1, 2004 (KR) ...................... 10-2004-0050958

(51) Int. Cl.
*H04N 3/14* (2006.01)
(52) U.S. Cl. ...................... 348/308; 348/294; 348/296; 348/301

(58) Field of Classification Search ................. 348/308, 348/294, 296, 301; 250/208.1
See application file for complete search history.

(56) References Cited

U.S. PATENT DOCUMENTS

| 6,130,423 A | 10/2000 | Brehmer et al. |
| 6,215,113 B1 | 4/2001 | Chen et al. |
| 2004/0119863 A1* | 6/2004 | Cho ........................... 348/308 |
| 2006/0108614 A1* | 5/2006 | Yi et al. ...................... 257/239 |

FOREIGN PATENT DOCUMENTS

| KR | 2000-19728 A | 4/2000 |
| KR | 2002-57251 A | 10/2003 |

* cited by examiner

*Primary Examiner*—Sinh Tran
*Assistant Examiner*—Selam Gebriel
(74) *Attorney, Agent, or Firm*—Birch, Stewart, Kolasch & Birch, LLP

(57) ABSTRACT

Disclosed herein is a Complementary Metal-Oxide-Silicon (CMOS) image sensor. The image sensor includes a two-dimensional pixel array composed of unit pixels, each unit pixel having a photo diode and transistors, a row decoder located at an end of the pixel array to assign row addresses, and a column decoder located at another end of the pixel array, which is erpendicular to the row decoder, to assign column addresses to corresponding pixels in rows selected by the row decoder. The row decoder allows the integration time points of the unit pixels, which are included in the pixel array, to be identical. Accordingly, the distortion of images can be prevented.

11 Claims, 5 Drawing Sheets

[Fig. 1] PRIOR ART
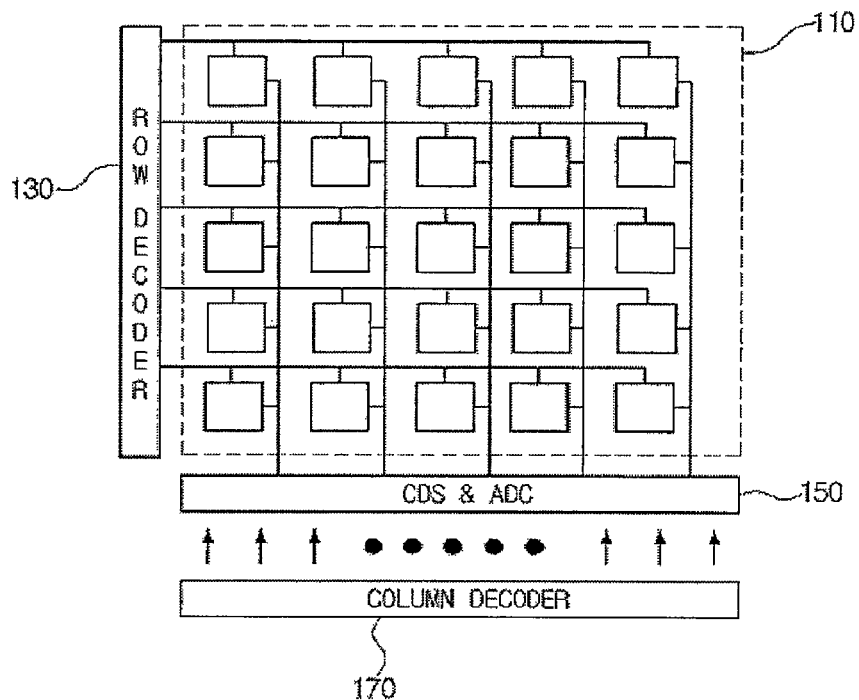
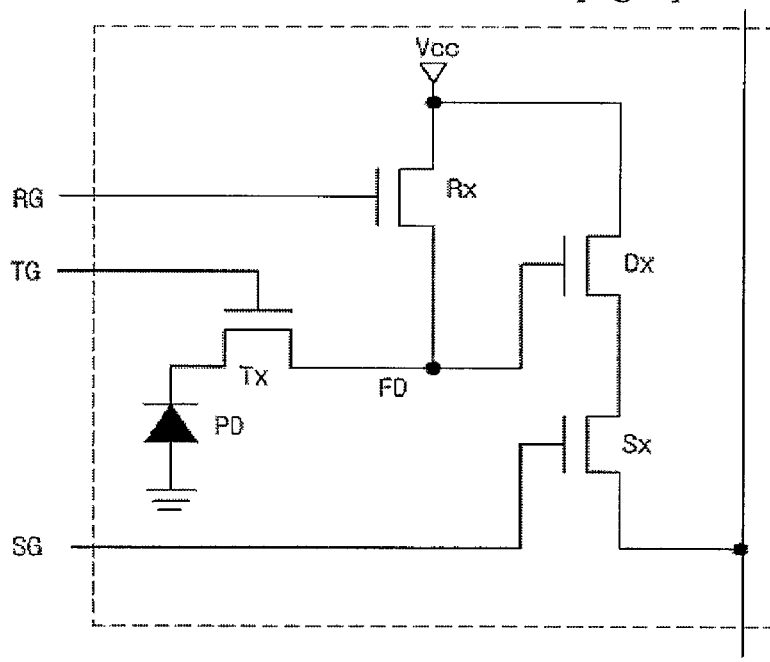
[Fig. 2]

[Fig. 3]
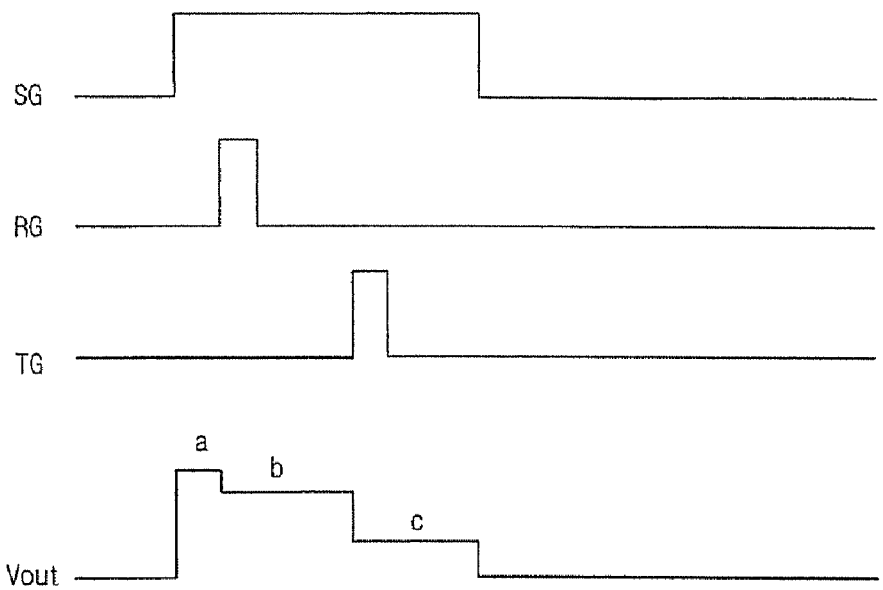
[Fig. 4] PRIOR ART
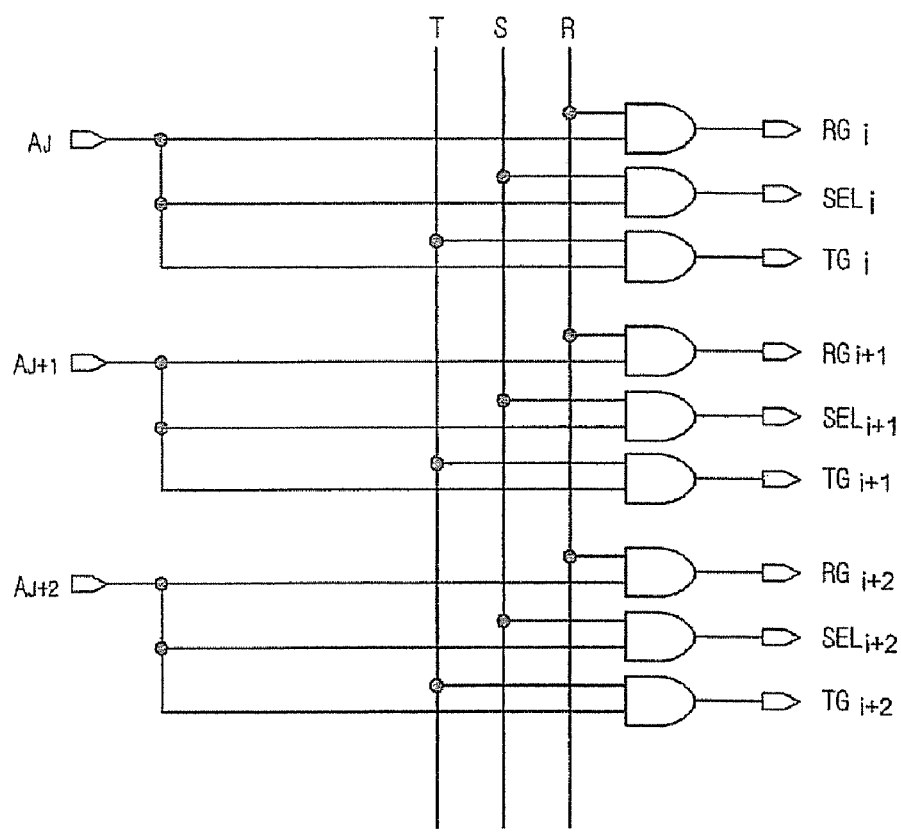

[Fig. 5] PRIOR ART
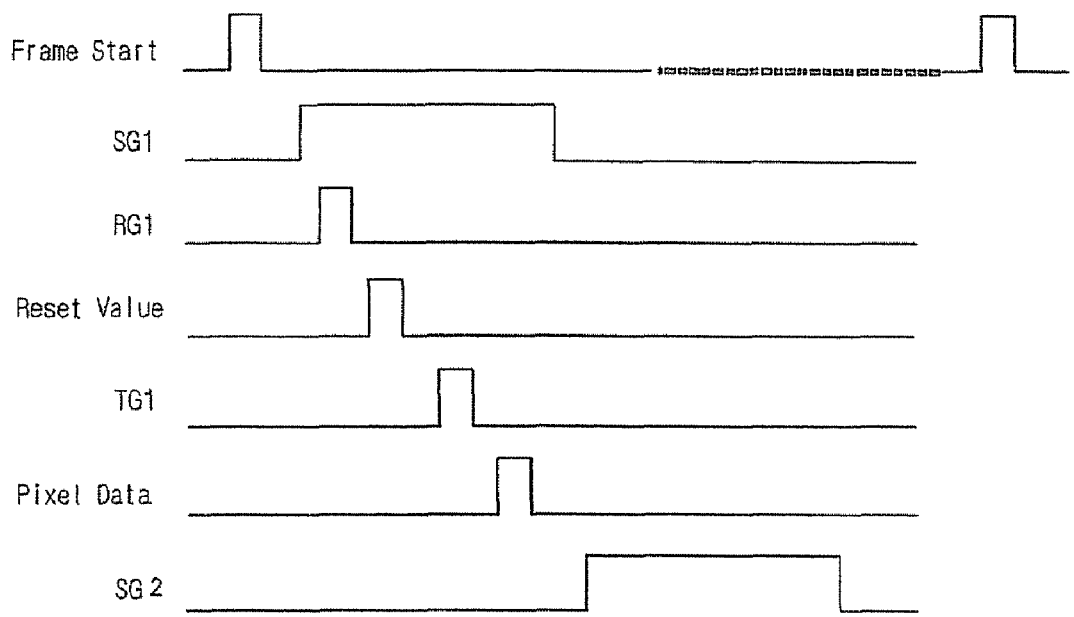
[Fig. 6]
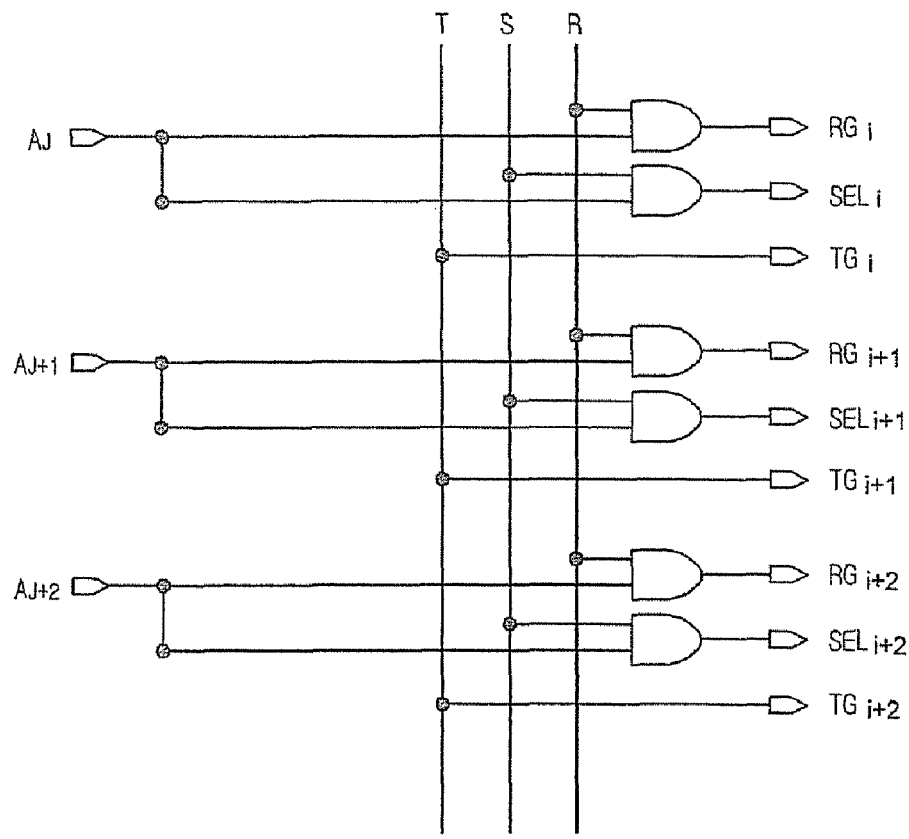

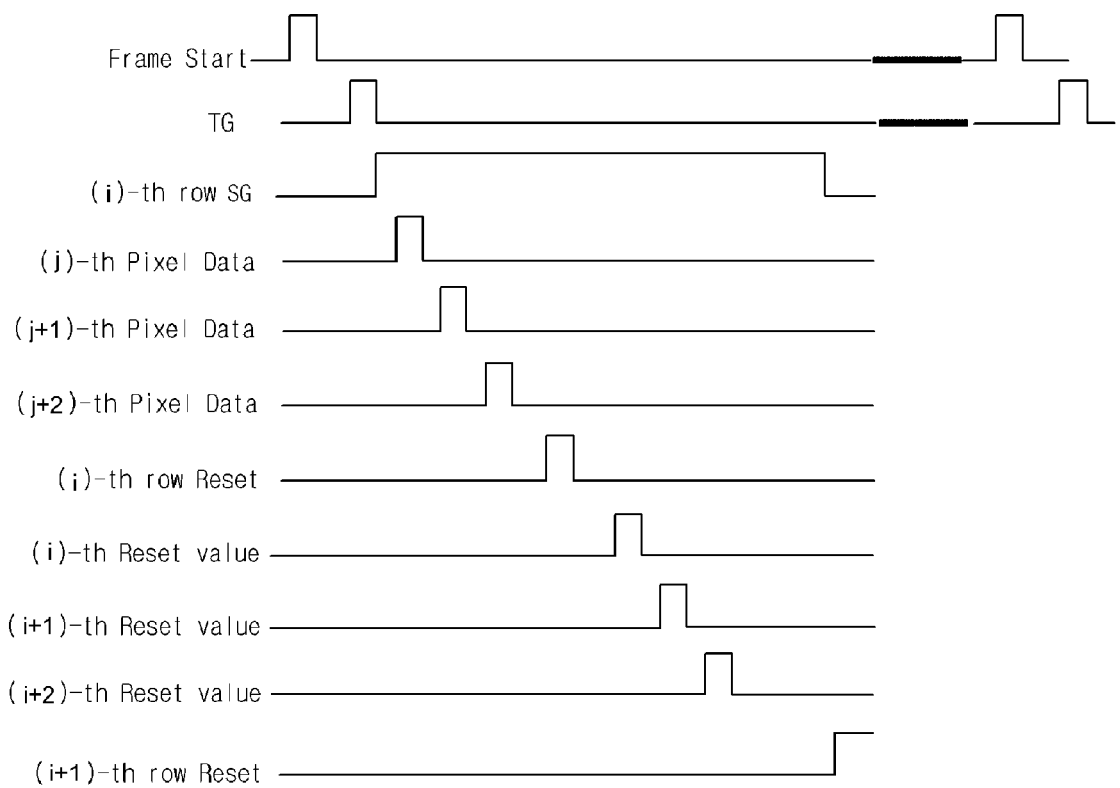

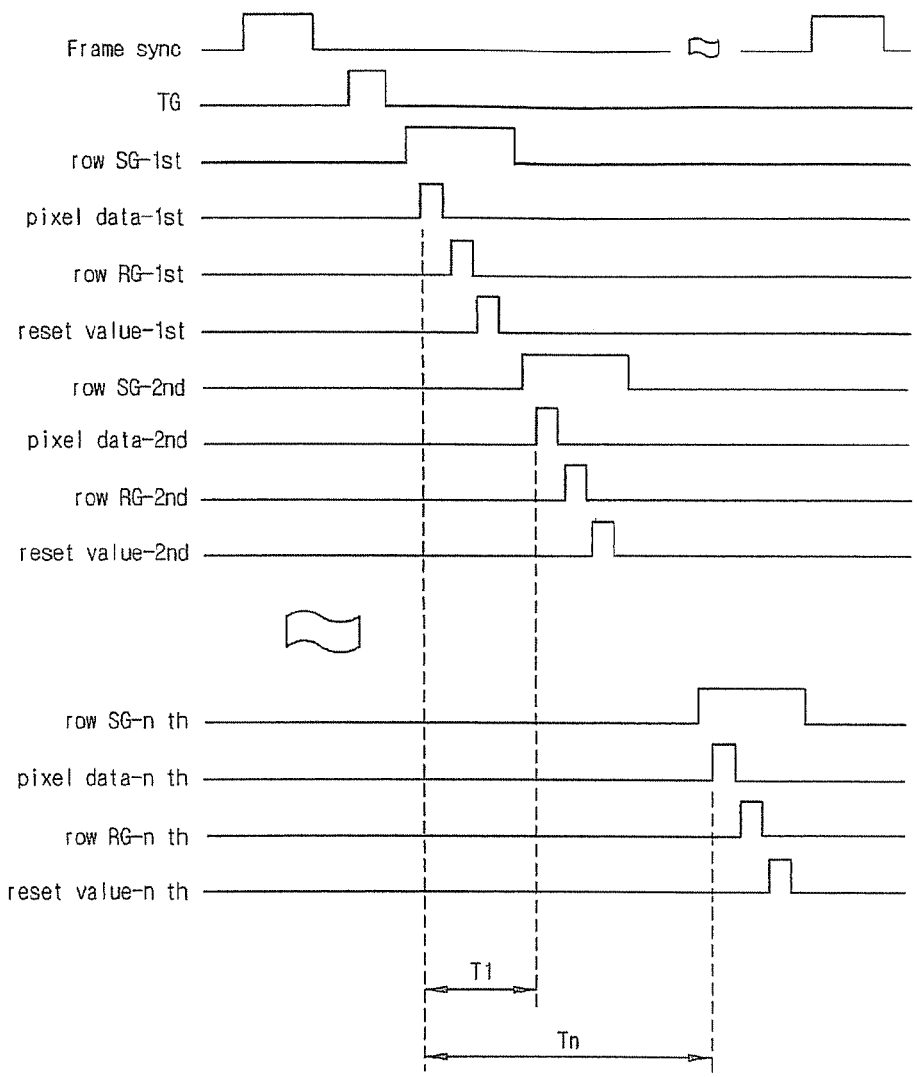
[Fig. 8] PRIOR ART
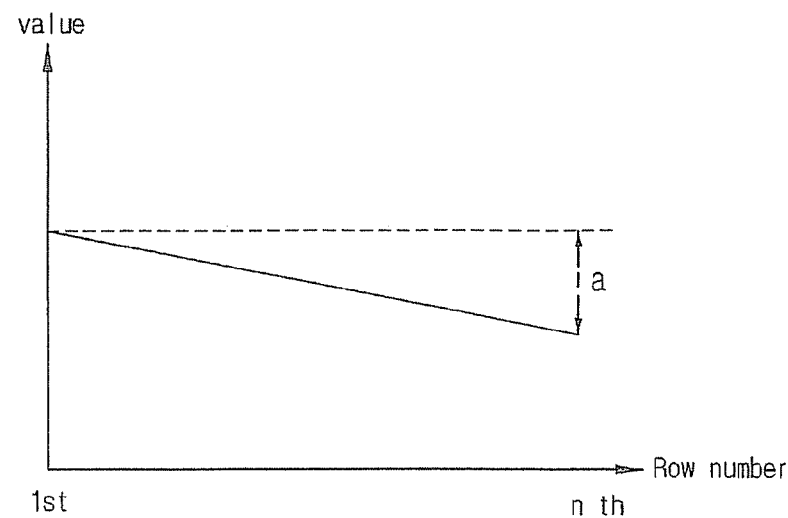
[Fig. 9]

CMOS IMAGE SENSOR HAVING DIRECTLY OUTPUT TRANSFER GATE SIGNAL

CROSS REFERENCE TO RELATED APPLICATIONS

This application is a U.S. National Application of International Application PCT Application No. PCT/KR05/002068 filed on Jun. 30, 2005, which claims the benefit of priority from Korean Patent Application No. 10-2004-0050958 filed on Jul. 1, 2004. The disclosures of International Application PCT Application No. PCT/KR05/002068 and Korean Patent Application No. 10-2004-0050958 are incorporated herein by reference.

TECHNICAL FIELD

The present invention relates to a CMOS(Complementary Metal-Oxide-Silicon) image sensor and, more particularly, to a CMOS image sensor that which can make integration time point same, thus preventing the distortion of an image.

BACKGROUND ART

Recently, Digital cameras and Camera phones are rapidly being developed and commercialized. Digital cameras and Camera phones generally sense light using semiconductor sensors, and the semiconductor sensors mainly used include a Complementary Metal-Oxide-Silicon (CMOS) image sensor and a Charge Coupled Device (CCD) image sensor.

A CMOS image sensor refers to a device for converting optical images into electrical signals using CMOS manufacturing technology and employs a switching method of providing a number of MOS transistors corresponding to the number of pixels and sequentially detecting outputs using the transistors. Currently, in contrast to the CCD image sensor widely used as an image sensor, the CMOS image sensor has advantages in that the driving method thereof is easy, various scanning methods can be implemented, it is possible to make products compact because signal processing circuits can be integrated into a single chip, manufacturing costs can be lowered because compatible CMOS technology is used, and power consumption can be greatly reduced.

FIG. 1 is a block diagram of a conventional CMOS image sensor. Referring to FIG. 1, the CMOS image sensor includes a pixel array 110, a row decoder 130, a Correlated Double Sampling (CDS) unit and Analog Digital Converter (ADC) (hereinafter referred to as a "CDS & ADC") 150, and a column decoder 170.

In the pixel array 110, unit pixels, shown in FIG. 2, are arranged, a row decoder 130 for assigning row addresses is disposed along one side of the pixel array 110 around the pixel array 110, and a column decoder 170, to which the outputs of the pixels are connected, for assigning the column addresses of the pixels is disposed in a direction perpendicular to the row decoder 130.

The row decoder 130 is composed of a plurality of row decoder cells each having a plurality of gates. Each of the row decoder cells receives input signals through an address input line, a transfer signal input line, a selection signal input line, and a reset signal input line, and outputs output signals through a reset gate signal output unit for outputting a reset gate signal generated in response to a reset signal, which is entered through the reset signal input line, and an address signal, which is entered through the address signal input line, a selection gate signal output unit for outputting a selection gate signal generated in response to a selection signal, which is entered through the selection signal input line, and an address signal, which is entered through the address signal input line, and a transfer signal output line for outputting a transfer signal that is entered through the transfer signal input line.

In a detailed process of extracting data from the image sensor, a first row is selected by the row decoder 130, the respective pixel data of the first row selected by the column decoder 170 are extracted, and then the extracted pixel data are amplified. Thereafter, a second row is selected by the row decoder 130, the respective pixel data of the second row selected by the column decoder 170 are extracted, and then the extracted pixel data are amplified. In this manner, the data of overall pixels are extracted.

Meanwhile, the CDS & ADC unit 140 operates such that it converts analog data, which are extracted from the unit pixels, into digital data, and realizes high image quality through sampling.

FIG. 2 is a circuit diagram of a unit pixel having a 4-Transistor (4-T) structure. With reference to FIG. 2, the unit pixel is composed of one photo diode PD and four NMOS transistors. The four NMOS transistors are composed of a reset transistor Rx for resetting the potential of the photo diode in response to the reset gate signal, a transfer transistor Tx for transferring electrons, which are charged in the photo diode, to a floating diffusion region in response to the transfer signal, a drive transistor Dx for changing the output voltage of each unit pixel by changing the current of a source follower circuit according to variation in the electrode voltage of the floating diffusion region, and a select transistor Sx for outputting the output voltage of each unit pixel, which is generated according to variation in the voltage of the floating diffusion region, as analog output voltage in response to the selection gate signal.

The detailed operation of the unit pixel is described with reference to the operational timing diagram of FIG. 3. First, when a corresponding row is selected by a selection gate signal SG, the select transistor Sx is turned on, and the reset transistor Rx resets the voltage of a floating diffusion region by a reset gate signal RG. Thereafter, when light enters into the photo diode, electrons are generated. When the transfer transistor Tx is turned on by a transfer gate signal TG, charges based on the accumulation of the electrons generated at the photo diode are transferred to the floating diffusion region, and the drive transistor Dx changes the output voltage of the unit pixel in proportion to the amount of charge in the floating diffusion region.

In FIG. 3, level 'a' is the initial voltage level of an output node after the corresponding row has been selected by the selection gate signal SG, level 'b' is the voltage level of an output node after the reset has been performed by the reset gate signal RG, and level 'c' is a voltage level after diffusion into the floating diffusion region has been performed by the transfer gate signal. In this case, the difference between the voltage levels 'b' and 'c' of the output node is output as an actual image data signal.

FIG. 4 is a general circuit diagram of a conventional row decoder. Referring FIG. 4, the reset gate signal $RG_i$, transfer gate signal $TG_i$, and selection gate signal $SG_i$ of an i-th row, the reset gate signal $RG_{i+1}$, transfer gate signal $TG_{i+1}$, and selection gate signal $SG_{i+1}$ of an i+1-th row, and the reset gate signal $RG_{i+2}$, transfer gate signal $TG_{i+2}$, and selection gate signal $SG_{i+2}$ of an i+2-th row are generated by the combination of row addresses $A_i$, $A_{i+1}$, and $A_{i+2}$ and a transfer signal T, and a selection signal S and a reset signal R.

In this case, a timing diagram shown in FIG. 5 is used because the CMOS image sensor selects respective rows using shift registers and then activates unit pixels.

FIG. 5 is a timing diagram when the conventional image sensor outputs respective pixel data at respective unit pixels.

Referring to FIG. 5, the CMOS image sensor selects a first row using a selection gate signal SG1, performs reset using a reset gate signal RG1, and then measures the voltage (reset value) of the floating diffusion region after the reset. Thereafter, the CMOS image sensor allows the charges, which have been accumulated in the photo diode, to be transferred to the floating diffusion region by a transfer gate signal TG1 and then measures the voltage (pixel data) of the floating diffusion region again. Thereafter, the CMOS image sensor selects a second row using a selection gate signal SG2 and repeats the above-described process.

In the above-described method of outputting image data, the time point when the first row receives light and the time point when the n-th row receives light are different when n (where n is a natural number) rows exist. In this case, a problem exists in that a moving image can be distorted when the CMOS image sensor photographs the image.

DISCLOSURE OF INVENTION

Technical Problem

The present invention has been made keeping in mind the above problems occurring in the prior art, and an object of the present invention is to provide a CMOS image sensor that prevents the distortion of images.

Technical Solution

In order to accomplish the above object, the present invention provides a CMOS image sensor, including a two-dimensional pixel array composed of unit pixels, each unit pixel having a photo diode and transistors, a row decoder located at an end of the pixel array to assign row addresses, and a column decoder located at another end of the pixel array, which is perpendicular to the row decoder, to assign column addresses to corresponding pixels in a row selected by the row decoder, wherein the row decoder includes a plurality of row decoder cells, each of the row decoder cells including: an address signal input line; a transfer signal input line; a selection signal input line; a reset signal input line; a reset gate signal output unit for outputting a reset gate signal that is generated in response to a reset signal, which is entered through the reset signal input line, and an address signal, which is entered through the address signal input line; a selection gate signal output unit for outputting a selection gate signal that is generated in response to a selection signal, which is entered through the selection signal input line, and the address signal, which is entered through the address signal input line; and a transfer signal output line for outputting a transfer signal which is entered through the transfer signal input line.

The transistors of the unit pixel are a reset transistor (Rx) for resetting a potential of the photo diode in response to the reset gate signal, a transfer transistor (Tx) for transferring electrons, which are charged in the photo diode, to a floating diffusion region in response to the transfer signal, a drive transistor (Dx) for changing an output voltage of each unit pixel by changing a current of a source follower circuit according to variation in an electrode voltage of the floating diffusion region, and a select transistor (Sx) for outputting output voltage of each unit pixel, which is generated according to variation in the voltage of the floating diffusion region, as analog signal in response to the selection gate signal.

Furthermore, the CMOS image sensor allows the transfer transistors of all unit pixels to be turned on by the transfer signal, selects a row using the selection gate signal, and then measures voltage levels, which depend on the amounts of charge accumulated in the unit pixels, by the row, and resets the unit pixels by the row using the reset gate signal and then measures voltage levels after reset.

Furthermore, the CMOS image sensor further includes a CDS unit for measuring an actual image data signal using differences between the voltage levels depending on the accumulated amounts of charge and the voltage levels after the reset.

Furthermore, the CMOS image sensor further includes a reduction rate measurement unit for measuring a rate of reduction between outputs from first to n-th (where n is a natural number) row data that are sequentially output from the image sensor according to operation of the row decoder.

Furthermore, the CMOS image sensor further includes a gain compensation unit for sequentially adding predetermined amounts of gain, which depends on the reduction rate measured by the reduction rate measurement unit, to outputs from first to n-th row.

Advantageous Effects

The CMOS image sensor according to the present invention realizes an identical integration time point for all pixels, thus preventing the distortion of images.

BRIEF DESCRIPTION OF THE DRAWINGS

FIG. 1 is a block diagram of a conventional CMOS image sensor;

FIG. 2 is a circuit diagram of a unit pixel having a 4-T (4-transistor) structure;

FIG. 3 is an operational timing diagram of the unit pixel;

FIG. 4 is a general circuit diagram of a conventional row decoder;

FIG. 5 is a timing diagram when the conventional image sensor outputs respective pixel data at respective unit pixels;

FIG. 6 is a general circuit diagram of a row decoder according to a preferred embodiment of the present invention;

FIG. 7 is a timing diagram of a CMOS image sensor according to a preferred embodiment of the present invention;

FIG. 8 is another timing diagram when the conventional image sensor outputs respective pixel data at respective unit pixels; and FIG. 9 is a conventional view showing the reduction rate of measured values depending on the difference in measured time between row data.

BEST MODE FOR CARRYING OUT THE INVENTION

Preferred embodiments of the present invention are described in detail with reference to the accompanying drawings below.

FIG. 6 is a general circuit diagram of a row decoder according to a preferred embodiment of the present invention. Referring to FIG. 6, a CMOS image sensor in accordance with the present invention allows transfer gate signals $TG_i$, $TG_{i+1}$ and $TG_{i+2}$ to be simultaneously turned on. In this case, integration time points, at which all unit pixels receive light and generate electrons, are identical, so that the distortion of pictures does not occur even when a fast moving image is viewed. The detailed method thereof is described in more detail with reference to a timing diagram of the CMOS image sensor of FIG. 7 according to a preferred embodiment of the present invention.

Referring to FIG. 7, the CMOS image sensor in accordance with the present invention allows a transfer gate signal TG to be turned on simultaneously and then selects an i-th row using a selection gate signal ((i)-th row SG). Thereafter, the CMOS image sensor sequentially measures voltage levels ((j)-th pixel data, (j+1)-th pixel data, and (j+2)-th pixel data) that depend on the amounts of charge accumulated in the unit pixels of the i-th row, and sequentially measures the voltage levels ((i)-th reset value, (i+1)-the reset value, and (i+2)-th reset value) of the respective unit pixels after resetting the i-th row using a reset gate signal ((i)-th row RG). The reason why the voltage levels are measured after reset is that actual image data signals can be measured using the difference between the voltage levels after diffusion into a floating region and the voltage levels after the reset, that is, that a CDS process needs to be undergone.

Thereafter, the CMOS image sensor selects an i+1-th row using a selection gate signal ((i+1)-th row SG) and repeats the above-described process.

As a result, the CMOS image sensor can measure the potential levels of respective pixels for each row even while realizing an identical integration time point for all pixels. That is, conventionally, transfer transistors Tx are turned on by the transfer gate signal TG for each row, so that there are the differences in integration time point for each row. However, in the present invention, all transfer transistors Tx are simultaneously turned on by the transfer gate signal TG, so that the differences in integration time point is not generated for each row and, therefore, the distortion of images can be prevented.

With reference to FIGS. 8 and 9, another embodiment of the present invention is described below. FIG. 8 is another timing diagram when the conventional image sensor outputs respective pixel data at respective unit pixels, and FIG. 9 is a view showing the reduction rate of measured values depending on the difference in measured time between conventional row data.

Referring to FIG. 8, the CMOS image sensor in accordance with the present invention measures the reduction rate of measured values based on the difference in measured time between row data that are sequentially output from the conventional image sensor, and adds an appropriate amount of gain to each row according to the measured reduction rate, thus preventing the distortion of images. That is, the conventional CMOS image sensor first selects a first row using a first selection gate signal (Row SG-1st) in synchronization with a fram sync signal and a transfer gate signal TG, allows the charges, which have been accumulated in the photo diode, to be transferred to a floating diffusion region by the transfer gate signal, and then measures the voltage (pixel data) of the floating diffusion region. Thereafter, the CMOS image sensor performs reset using the first selection gate signal (Row SG-1st), and measures a first voltage (Reset Value-1st) in the floating diffusion region. Thereafter, the CMOS image sensor selects a second row using a second selection gate signal (Row SG-2nd) and then repeats the above-described process. Finally, the conventional CMOS image sensor selects an n-th row using an n-th selection gate signal (Row SG-nth) and then repeats the above-described process. In this conventional method of outputting image data, when n rows exist, transfer gate signals TG are simultaneously turned on, and gate signals that drives the pixels of respective rows operates sequentially from the first row to the n-th row. Accordingly, a certain time difference occurs between a time T1 when the pixel data of the first row are measured, and a time Tn when the pixel data of the n-th row are measured, and the measured time difference causes a slight difference between the pixel data of respective rows and, therefore, results in imbalance in image quality.

However, the CMOS image sensor in accordance with the present invention, as shown in FIG. 9, measures a rate of reduction 'a' between first to n-th (where n is a natural number) row data which are output simultaneously from image sensor, and sequentially adds predetermined amounts of gain, which depend on the measured reduction rate 'a', to outputs from first to n-th row, thus eliminating the imbalance in image quality. The reduction rate, for example, can be obtained in such a manner as to install a backend Integrated Circuit (IC) at the rear end of the image sensor, determine the extent of the imbalance of image quality, and obtain a reduction rate with respect to the imbalance. Appropriate amounts of gain, which can compensate for the rate of reduction, can be determined through experimentation or can be automatically determined by an internal calculation in the image sensor. The determined amounts of gain are sequentially added to the outputs from first to n-th row through the internal Auto Gain Controller (AGC) and Analog Digital Converter (ADC) of the image sensor, so that they can influence images without change.

Accordingly, the conventional imbalance in image quality, which was generated due to the difference in measured time between respective row data, can be eliminated, and the distortion of images can also be eliminated.

Although the present invention has been described with reference to the accompanying drawings with emphasis on the preferred embodiments, those skilled in the art will appreciate that various modifications, additions and substitutions are possible, without departing from the scope and spirit of the invention as disclosed in the accompanying claims.

What is claimed is:

1. A Complementary Metal-Oxide-Silicon (CMOS) image sensor comprising:
   a two-dimensional array of a plurality of unit pixels, each unit pixel having a photo diode and transistors;
   a row decoder, the row decoder assigning row addresses, the row decoder having a plurality of row decoder cells, each of the row decoder cells including an address signal input line, a transfer signal input line, a selection signal input line, a reset signal input line, a reset gate signal output unit, a selection gate signal output unit, and a transfer signal output line;
   a column decoder, the column decoder assigning column addresses to corresponding pixels in a row selected by the row decoder; and
   a reduction rate measurement unit, the reduction rate measurement unit measuring a rate of reduction between outputs from first to n-th row data that are sequentially output from the CMOS image sensor according to an operation of the row decoder, wherein n is a natural number,
   wherein the reset gate signal output unit outputs a reset gate signal that is generated in response to a reset signal, which is entered through the reset signal input line, and an address signal, which is entered through the address signal input line,
   the selection gate signal output unit outputs a selection gate signal that is generated in response to a selection signal, which is entered through the selection signal input line, and the address signal, which is entered through the address signal input line, and
   the transfer signal output line outputs a transfer signal which is entered through the transfer signal input line, wherein the transfer signal is directly output from the transfer signal input line to the transfer signal output line.

2. The CMOS image sensor according to claim 1, wherein the transistors of each unit pixel comprise:
   a reset transistor (Rx) configured to reset a potential of the photo diode in response to the reset gate signal;
   a transfer transistor (Tx) configured to transfer electrons, which are charged in the photo diode, to a floating diffusion region in response to the transfer signal;
   a drive transistor (Dx) configured to change an output voltage of each unit pixel by changing a current of a source follower circuit according to a variation in an electrode voltage of the floating diffusion region; and
   a select transistor (Sx) configured to output a voltage of each unit pixel, which is generated according to the variation in the voltage of the floating diffusion region, as an analog signal voltage in response to the selection gate signal.

3. The CMOS image sensor according to claim 2, wherein the CMOS image sensor allows the transfer transistors of all unit pixels to be turned on by the transfer signal, selects a row using the selection gate signal, and then measures voltage levels, which depend on amounts of charge accumulated in the respective unit pixels, by the row, and resets the unit pixels by the row using the reset gate signal and then measures voltage levels after reset.

4. The CMOS image sensor according to claim 3, further including a Correlated Double Sampling (CDS) unit, the CDS unit measuring an actual image data signal using differences between the voltage levels depending on the accumulated amounts of charge and the voltage levels after the reset.

5. The CMOS image sensor according to claim 1, further including a gain compensation unit, the gain compensation unit sequentially adding predetermined amounts of gain, which depends on the reduction rate measured by the reduction rate measurement unit, to outputs from first to n-th row.

6. The CMOS image sensor according to claim 1, wherein respective transfer signal output lines of the plurality of row decoder cells output the transfer gate signal simultaneously.

7. A Complementary Metal-Oxide-Silicon (CMOS) image sensor comprising:
   a two-dimensional array of a plurality of unit pixels, each unit pixel having a photo diode and transistors;
   a row decoder, the row decoder assigning row addresses, the row decoder having a plurality of row decoder cells, each of the row decoder cells including an address signal input line, a transfer signal input line, a selection signal input line, a reset signal input line, a reset gate signal output unit, a selection gate signal output unit, and a transfer signal output line;
   a column decoder, the column decoder assigning column addresses to corresponding pixels in a row selected by the row decoder; and
   a reduction rate measurement means for measuring a rate of reduction between outputs from first to n-th row data that are sequentially output from the CMOS image sensor according to operation of the row decoder, wherein n is a natural number,
   wherein the reset gate signal output unit outputs a reset gate signal that is generated in response to a reset signal, which is entered through the reset signal input line, and an address signal, which is entered through the address signal input line,
   wherein the selection gate signal output unit outputs a selection gate signal that is generated in response to a selection signal, which is entered through the selection signal input line, and the address signal, which is entered through the address signal input line,
   wherein the transfer signal output line outputs a transfer signal which is entered through the transfer signal input line, and
   wherein the transfer signal is directly output from the transfer signal input line to the transfer signal output line.

8. The CMOS image sensor according to claim 7, wherein the transistors of each unit pixel comprise:
   a reset transistor configured to reset a potential of the photo diode in response to the reset gate signal;
   a transfer transistor configured to transfer electrons, which are charged in the photo diode, to a floating diffusion region in response to the transfer signal;
   a drive transistor configured to change an output voltage of each unit pixel by changing a current of a source follower circuit according to a variation in an electrode voltage of the floating diffusion region; and
   a select transistor configured to output a voltage of each unit pixel, which is generated according to the variation in the voltage of the floating diffusion region, as an analog signal voltage in response to the selection gate signal.

9. The CMOS image sensor according to claim 8, wherein the CMOS image sensor allows the transfer transistors of all unit pixels to be turned on by the transfer signal, selects a row using the selection gate signal, and then measures voltage levels, which depend on amounts of charge accumulated in the respective unit pixels, by the row, and resets the unit pixels by the row using the reset gate signal and then measures voltage levels after reset.

10. The CMOS image sensor according to claim 9, further including a Correlated Double Sampling (CDS) means for measuring an actual image data signal using differences between the voltage levels depending on the accumulated amounts of charge and the voltage levels after the reset.

11. The CMOS image sensor according to claim 7, further including a gain compensation means for sequentially adding predetermined amounts of gain, which depends on the reduction rate measured by the reduction rate measurement means, to output from first to n-th row.

* * * * *